(12) United States Patent
Sherlock et al.

(10) Patent No.: US 7,231,724 B2
(45) Date of Patent: Jun. 19, 2007

(54) NOZZLE SEAL SLOT MEASURING TOOL AND METHOD

(75) Inventors: Graham David Sherlock, Greenville, SC (US); Paul Lawrence Kalmar, Zirconia, NC (US); Christopher Edward Thompson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/260,151

(22) Filed: Oct. 28, 2005

(65) Prior Publication Data

US 2007/0094880 A1    May 3, 2007

(51) Int. Cl.
*G01B 5/14* (2006.01)
(52) U.S. Cl. ............................ 33/542; 33/1 N; 33/534; 33/DIG. 8
(58) Field of Classification Search ............... 33/1 N, 33/1 BB, 1 PT, 1 AP, 534, 542, 701, DIG. 8, 33/556
See application file for complete search history.

(56) References Cited

U.S. PATENT DOCUMENTS

| | | | | |
|---|---|---|---|---|
| 2,751,686 A | * | 6/1956 | Etzelt | 33/797 |
| 3,693,682 A | * | 9/1972 | Hasfjord | 144/130 |
| 3,845,562 A | * | 11/1974 | Dallas | 33/605 |
| 4,229,884 A | * | 10/1980 | Knoll et al. | 33/556 |
| 4,471,531 A | * | 9/1984 | Gunderson | 33/657 |
| 4,510,691 A | * | 4/1985 | Meyer | 33/556 |
| 5,249,920 A | | 10/1993 | Shepherd et al. | |
| 5,297,060 A | * | 3/1994 | Foletti et al. | 702/6 |
| 5,328,101 A | | 7/1994 | Munshi | |
| 5,584,173 A | | 12/1996 | Lybarger | |
| 5,624,227 A | | 4/1997 | Farrell | |
| 6,471,469 B2 | | 10/2002 | Toffan et al. | |

* cited by examiner

*Primary Examiner*—R. Alexander Smith
(74) *Attorney, Agent, or Firm*—Nixon & Vanderhye P.C.

(57) ABSTRACT

A tool for measuring seal slot position includes a tool shaft having a longitudinal axis, a pin eccentrically disposed at one end of the tool shaft relative to the longitudinal axis, and a disk member disposed at an opposite end of the tool shaft that facilitates rotation of the tool shaft and pin in the seal slot. The tool provides for increased accuracy in measuring seal slot position such as turbine nozzle seal slot position.

9 Claims, 3 Drawing Sheets

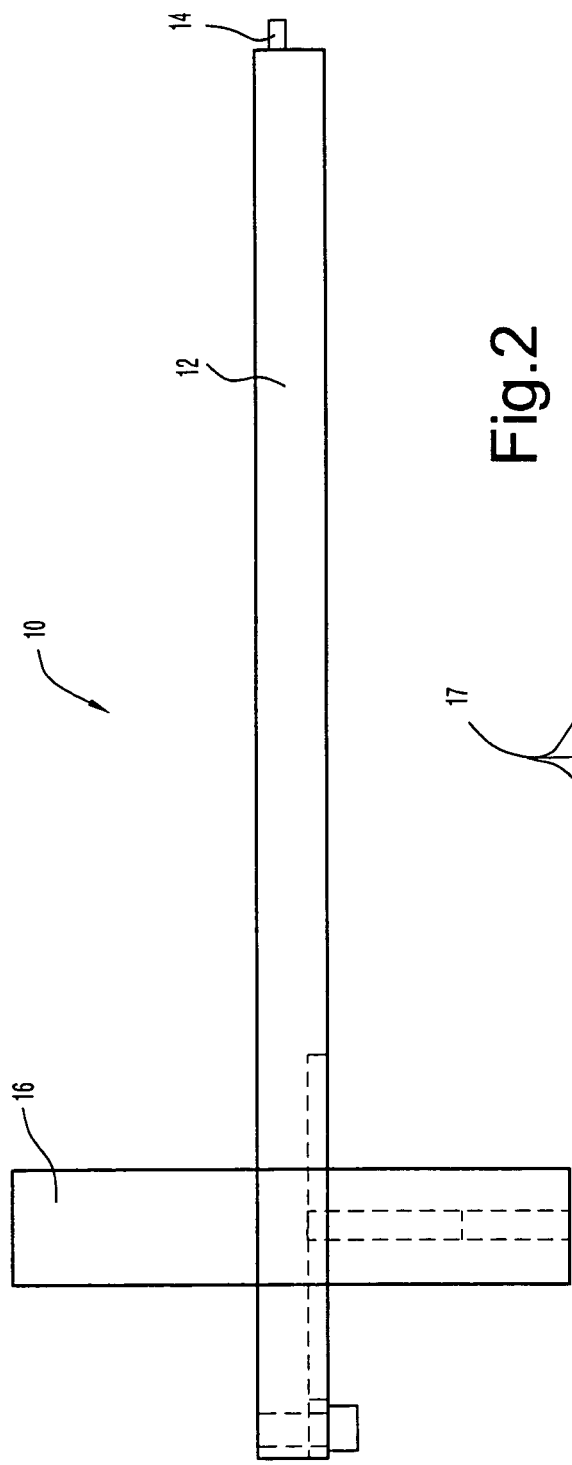
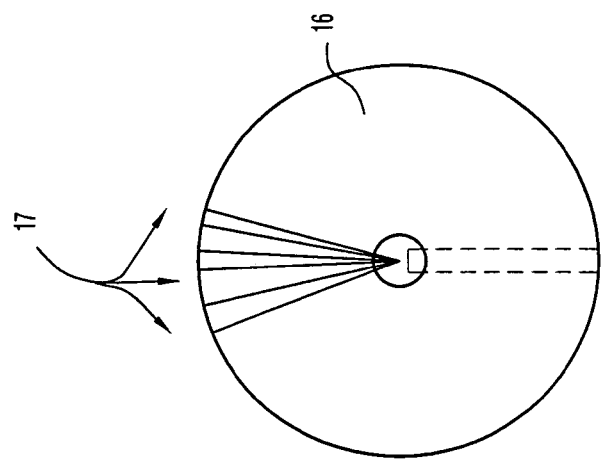
Fig.2
Fig.3

NOZZLE SEAL SLOT MEASURING TOOL AND METHOD

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The present invention relates to a nozzle seal slot tool and method and, more particularly, to a nozzle seal slot tool including a continuous measurement pin capable of providing continuous measurement data and having a readable scale.

It is desirable to control the position of seal slots within drawing dimensions because the seals fit within the slots of adjacent nozzle segments. If the seal slot positions are not aligned between adjacent segments, it will not be possible to install the seals. Service run nozzles in a gas turbine may have distorted sidewalls as a result of previous weld repairs or due to stress relief during service. Creep strain due to applied loads at operating temperatures may also contribute to distortion. This movement of the sidewalls will cause the seal slots that are contained within the sidewalls to be out of position relative to engine center.

The operator needs to know how far out of position the slots are to press the walls, and therefore slots, back into position. If the sidewalls are not pressed back into position, the seal slots between adjacent segments would not be aligned with each other, and it may prove impossible to fit the seals in place. Alternatively, it may be possible to force the seals into the slots but this would lock the nozzle segments together such that they could not move or "float" relative to each other. This float is necessary to allow for thermal expansion and to ensure the segments load up against the sealing faces (hook fit and chordal hinge) during operation. If they are locked together, it is likely they will be skewed and will not load against their sealing faces. This will result in compressor discharge air leaking directly into the hot gas path and will reduce the amount of air available for combustion and for cooling of the nozzle. The result of reduced air for combustion will be lower performance of the turbine and increased emissions. A reduction in available cooling air will result in increased oxidation of the nozzle due to a resultant higher metal temperature and the lack of cooling will also cause changes to thermal gradients within the nozzle leading to increased cracking of the part. This will increase subsequent repair costs and may reduce the life of the parts.

Misaligned sidewalls may also result in flow path steps. The hot gas will not have a smooth path but will be tripped by the mismatch between adjacent nozzle segments, resulting in turbulent flow and reduced energy of the gas stream, thereby reducing engine performance. Turbulent flow also increases thermal transfer to the nozzle and so will raise the metal temperature, leading to increased oxidation and cracking.

Seal slot position measurement is currently conducted by means of a "go/no-go" gauge, typically having two flats mounted on a precision ground shaft. To perform the measurement, a pedestal assembly is positioned adjacent the turbine. The pedestal assembly includes a series of bushings that are precisely positioned for slot measurement. The gauge is inserted into the seal slots via the bushings to determine whether the opening is smaller or larger than a fixed amount, which is defined by the tool. The gauge thus only allows for crude measurement within set limits.

BRIEF SUMMARY OF THE INVENTION

In an exemplary embodiment of the invention, a tool for measuring seal slot position includes a tool shaft having a longitudinal axis, an eccentric pin sized to fit into a seal slot disposed at one end of the tool shaft, and a disk member disposed at an opposite end of the tool shaft. The disk member facilitates rotation of the tool shaft and pin in the seal slot. An exemplary seal slot suitable for the invention is a turbine nozzle seal slot.

In another exemplary embodiment of the invention, a method of measuring seal slot position includes the steps of inserting an eccentric pin disposed at an end of a tool shaft into the seal slot and positioning the pin so that it bears against a side of the slot; rotating the tool shaft via a disk; and measuring the seal slot position based on an amount of tool shaft rotation by observing a position of gradation markings on the disk relative to a target point.

BRIEF DESCRIPTION OF THE DRAWINGS

FIG. 2 is a side view of the turbine nozzle seal slot position measuring tool of the invention;

FIG. 3 is an end view thereof; and

DETAILED DESCRIPTION OF THE INVENTION

Figure 1:
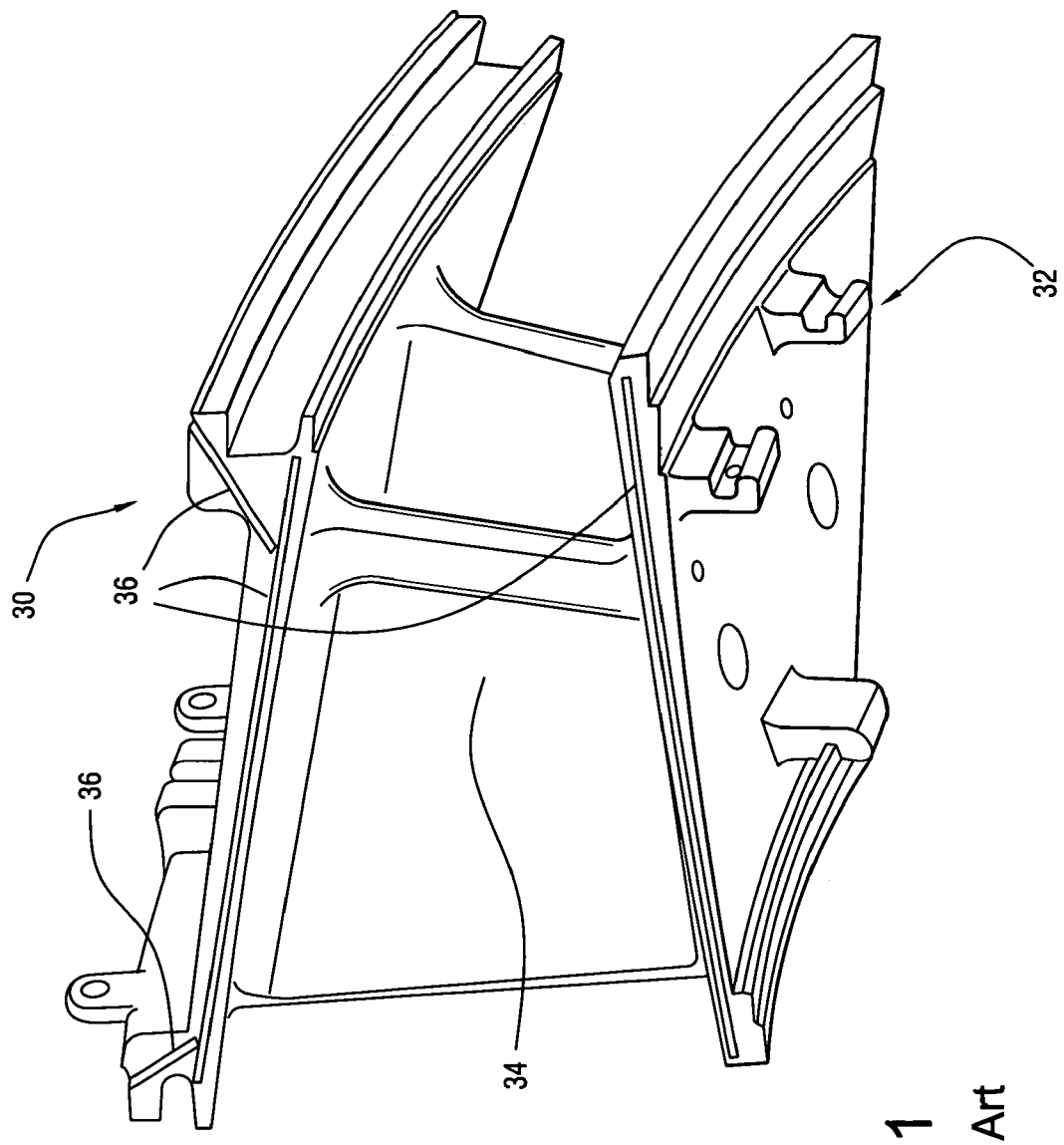
FIG. 1 shows nozzle seal slots in a gas turbine nozzle section.

FIG. 1 is a perspective view of a gas turbine nozzle section. Generally, the section includes an outer wall 30, an inner wall 32, and an airfoil 34 therebetween. The section also includes a number of seal slots 36. The seal slots 36 exist to retain the end face seals (sometimes referred to as spline seals or slash face seals) that seal between adjacent nozzle segments and prevent the ingestion of compressor discharge air into the gas path.

Figure 4:
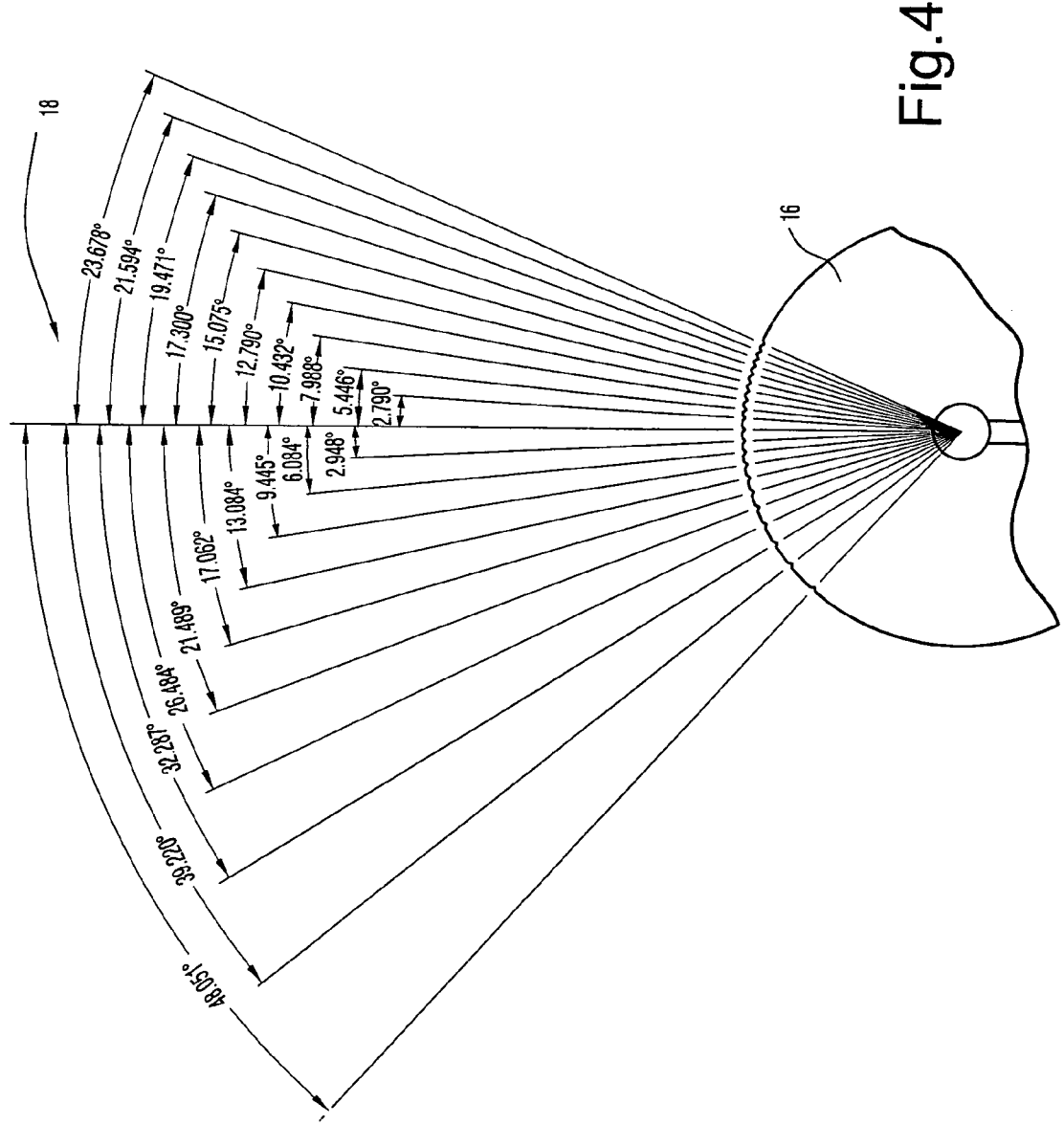
FIG. 4 is a detailed view of the disk member showing gradation markings.

FIGS. 2-4 illustrate the tool of the invention for measuring turbine nozzle seal slot position. The tool 10 includes a tool shaft 12 having a longitudinal axis. A pin 14 such as a hardened dowel pin or the like is disposed at one end of the tool shaft 12 and is eccentric relative to the longitudinal axis. The pin 14 may be machined from the shaft 12 or may be brazed to the shaft and finish machined into the final product. The pin 14 is sized appropriately to fit into a turbine nozzle seal slot. For example, a width of the pin is generally about 5 to 20 thousandths of an inch smaller than the smallest permitted width of the slot.

The tool 10 also includes a disk member 16 disposed near an opposite end of the tool shaft 12. The disk member 16 facilitates rotation of the tool shaft 12 and pin 14 in the nozzle seal slot. As shown in FIG. 3, color coded arc sections 17 may be provided on the disk member 16 to designate position zones. For example, a central area may be colored green to designate an acceptable seal slot position while the largest arc sections may be colored red to designate unacceptable seal slot position. With particular reference to FIG.

4, the disk member 16 is preferably provided with gradation markings 18 about at least a portion of its perimeter. In a preferred arrangement, the gradation markings 18 are grooves as shown.

With continued reference to FIG. 4, the gradation markings are not equi-spaced. This is because as the shaft 12 is rotated thereby rotating the pin 14 in the slot, the contact point of the eccentric pin 14 with the side edge changes, and each degree of movement to the left or right requires greater or lesser angular rotation. In a preferred arrangement, each gradation represents 0.005 inches of slot position. The disk 16 shown in FIG. 4 is configured for clockwise rotation, which is dependent on a position of the slot to be measured. It will be appreciated that a similarly configured disk would be included with the tool 10 for counterclockwise measurement.

In use, a pedestal assembly is positioned adjacent the turbine. The pedestal assembly is essentially identical to that used with the conventional "go/no-go" gauge. The pedestal includes a series of bushings that are precisely positioned for slot measurement. The pedestal is slightly revised to include target points adjacent the bushings to determine a relative position of the disk 16 and thereby effect measurement of the slot. The shaft 12 is inserted into the bushing until the pin 14 is positioned in the nozzle seal slot so that it bears against a side of the slot. The tool shaft 12 is then rotated, and the seal slot position is measured based on an amount of tool shaft rotation. This measurement is obtained by observing a position of the gradation markings on the disk 16 relative to the target point affixed adjacent the bushing.

With the tool of the present invention, seal slot position can be determined more accurately than with existing gauges. The tool is configured to cooperate with existing pedestal fixtures. The disk at the end of the shaft facilitates rotation of the pin against the nozzle slot and enables a more accurate measurement.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A tool for measuring seal slot position, the tool comprising:
    a tool shaft having a longitudinal axis;
    a pin eccentrically disposed at one end of the tool shaft relative to the longitudinal axis, the pin being sized to fit into a seal slot; and
    a disk member disposed at an opposite end of the tool shaft, the disc member facilitating rotation of the tool shaft and pin in the seal slot, wherein the seal slot position is measured based on an amount of tool shaft rotation.

2. A tool according to claim 1, wherein the disk member comprises gradation markings about at least a portion of its perimeter.

3. A tool according to claim 2, wherein the gradation markings comprise grooves.

4. A tool according to claim 2, wherein the gradation markings are not equi-spaced.

5. A tool according to claim 1, wherein the pin is integral with the tool shaft.

6. A method of measuring turbine nozzle seal slot position using the tool of claim 1, the method comprising:
    inserting the pin into the nozzle seal slot and positioning the pin so that it bears against a side of the slot;
    rotating the tool shaft; and
    measuring the seal slot position based on an amount of tool shaft rotation.

7. A method according to claim 6, wherein the disk member includes gradation markings about at least a portion of its perimeter, and wherein the measuring step is practiced by observing a position of the gradation markings relative to a target point.

8. A method of measuring seal slot position comprising:
    inserting an eccentric pin disposed at an end of a tool shaft into the seal slot and positioning the pin so that it bears against a side of the slot;
    rotating the tool shaft via a disk; and
    measuring the seal slot position based on an amount of tool shaft rotation by observing a position of gradation markings on the disk relative to a target point.

9. A tool for measuring turbine nozzle seal slot position, the tool comprising:
    a tool shaft having a longitudinal axis;
    a pin eccentrically disposed at one end of the tool shaft relative to the longitudinal axis, the pin being sized to fit into a nozzle seal slot; and
    a disk member disposed at an opposite end of the tool shaft, the disc member facilitating rotation of the tool shaft and pin in the nozzle seal slot, wherein the seal slot position is measured based on an amount of tool shaft rotation.

* * * * *